H. L. MILLER.
SECTIONAL PLATFORM FOR CAROUSELS.
APPLICATION FILED FEB. 1, 1917.
Reissued Mar. 5, 1918.
14,440.
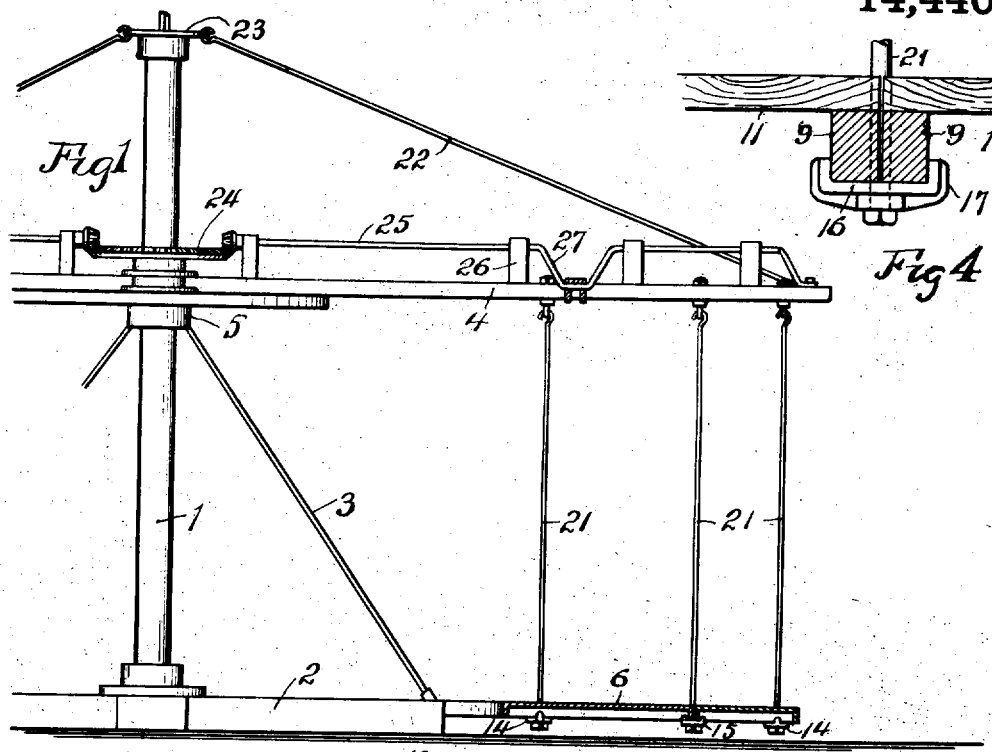
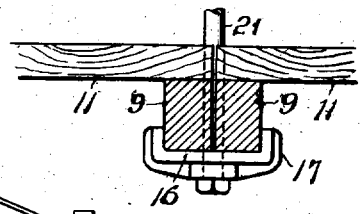
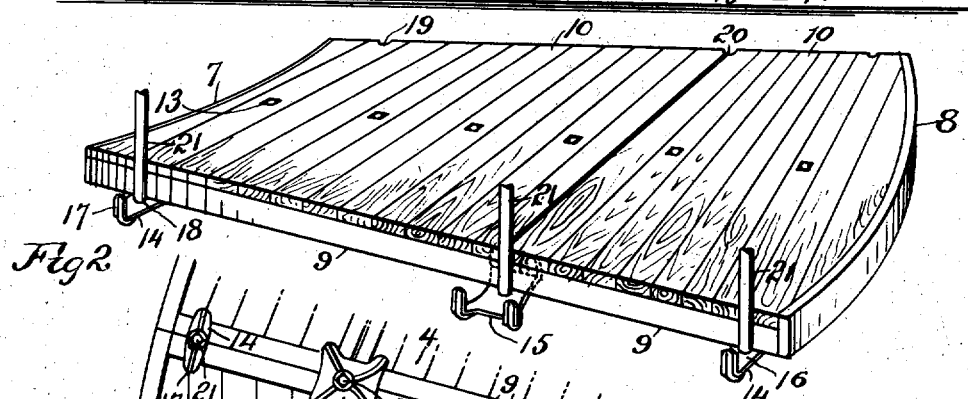
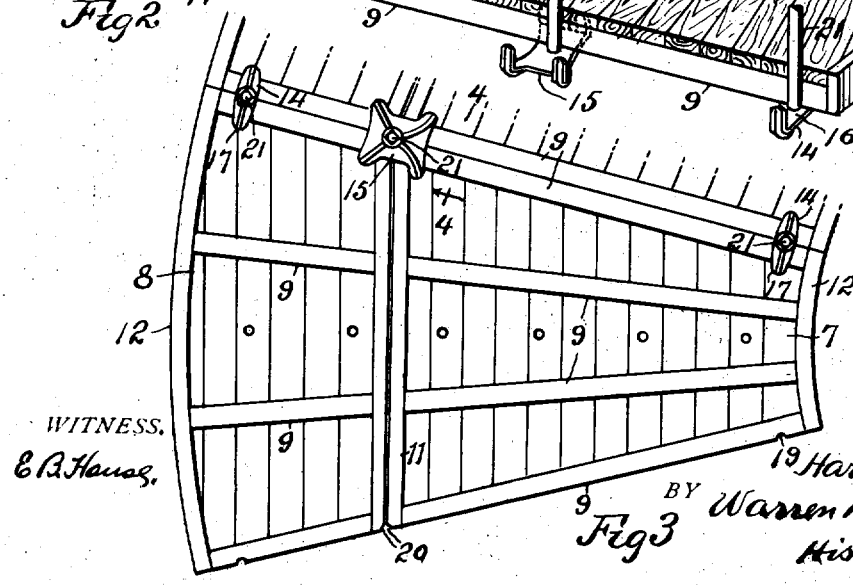
WITNESS.
E. B. Haines.
INVENTOR.
Harvey L. Miller
BY Warren D. House
His ATTORNEY

UNITED STATES PATENT OFFICE.

HARVEY L. MILLER, OF LEAVENWORTH, KANSAS, ASSIGNOR TO C. W. PARKER, OF LEAVENWORTH, KANSAS.

SECTIONAL PLATFORM FOR CAROUSELS.

14,440. Specification of Reissued Letters Patent. Reissued Mar. 5, 1918.

Original No. 1,204,681, dated November 14, 1916, Serial No. 34,610, filed June 17, 1915. Application for reissue filed February 1, 1917. Serial No. 146,042.

*To all whom it may concern:*

Be it known that I, HARVEY L. MILLER, a citizen of the United States, residing at Leavenworth, in the county of Leavenworth and State of Kansas, have invented a certain new and useful Improvement in Sectional Platforms for Carousels, of which the following is a specification.

My invention relates to carousels, and particularly to platforms or run boards therefor; and has for its object to provide a platform constituted of sections connected together in such a manner that some of them can readily be removed; whereby a platform of maximum size and capacity is attainable when all the sections are utilized; or a platform of smaller size and capacity is afforded when some of the sections are dispensed with.

The above and other objects and advantages of my invention are fully set forth in the following specification taken with the accompanying drawings, the same characters of reference being employed to indicate the same parts throughout.

On said drawings: Figure 1 is a side view, partly in section of a carousel fitted with my improved run board; Fig. 2 is a perspective view showing the arrangement of sections of which my platform is composed; Fig. 3 is a bottom plan showing how the sections are connected to one another; and Fig. 4 is a sectional view taken on line 4—4 of Fig. 3.

To meet the demands of the trade in carousels it is expedient to be able to furnish on order a construction which can be made larger or smaller as circumstances demand. In large cities and other populous places a carousel is apt to be patronized quite freely; while in less populous places the patronage will be relatively light. For the former localities it has been customary to rely upon a carousel having a platform or run board of sufficient capacity to carry figures of horses or other seat-supporting devices arranged three or four abreast; while for the latter a construction having a smaller run board will usually answer all requirements. But as owners of carousels frequently move about from place to place, it is more advisable to provide an amusement machine of this class that can be increased and diminished in size and capacity than one which can be made up in large and small sizes. The solution of such a problem is what the present invention seeks to accomplish.

Referring to the drawings I show at 1 the center post of a carousel of the ordinary type, resting upon a base 2, and braced by means of tie rods 3. This post or standard 1, supports a framework 4, which normally rests upon a collar 5 on the post 1, and turns around and around thereon when the machine is in operation. From this framework is suspended my improved platform 6; and I make this platform in sections which can be readily assembled and which are so designed as to enable the run board to be pieced out to increase its size and capacity, or reduced in dimensions to accommodate fewer patrons, as will now be clearly described.

The sections of which the platform 6 is constituted preferably comprise two sets; the sections of one set being indicated at 7 and those of the other set at 8. As usual, the run board 6 is ring-shaped, and the sections 7 are arranged end to end and located along the inner edge; while the sections 8 are similarly arranged and located along the outer edge of the platform. As shown, the sections 8 are smaller than the others, and the size and capacity of the platform can be increased or decreased simply by adding the sections 8 or dispensing with the same. Each section is made up of transverse beams 9, which will extend radially of the post 1 when the platform is assembled, and across these beams are laid the floor boards 10. The radial positions of the beams 9 are illustrated in Fig. 3, and it will be seen therefrom that the beams 9 of the sections 7 will be in alinement with the beams 9 of the sections 8 when both sets of sections are utilized. In order to facilitate placing the sections 7 side by side with the sections 8 over the entire extent of the run board, I have found it best to make the outer edges of the sections 7 straight, and the inner edges of the sections 8 straight, and connect the ends of the beams 9 at the edges mentioned by means of straight beams 11. The ends of the beams 9 adjacent the inner and outer edges of the sections 7 and 8 respectively may be joined by curved beams 12, thus giving the run board 6, when all the sections are in commission, a more finished appearance.

In the tops of each of the sections I fix socket members 13, by which benches, figures of horses, or other seat-supporting devices, are secured in place. Each section 7 will be large enough for two horses or the like, and each section 8 may receive but one. There will be a pair of socket members 13 for each seat-supporting device, and the sections 7 and 8 will therefore permit three horses or the like to be mounted abreast on the platform. When the smaller sections 8 are discarded, there will still be room for two horses abreast, and the run board 6 can be operated with the same advantage as in the first instance. Hence, when patrons are numerous, it is only necessary that the sections 8 be added; under other circumstances, they need not be added, or they can be taken off if in place.

The utility of such a construction should already be apparent. A platform of the design set forth can be easily applied to any carousel and each section will of course be individually suspended from the framework 4; also all the sections will be firmly secured together and held against displacement either in the plane of the run board or at an angle thereto. If the owner wants to operate his machine at full capacity, he utilizes all the sections; if he wants to adapt it to lighter patronage he simply takes off the outer sections. This can be done without in any way affecting the structural unity or the general configuration of the run board, and in such a case the series of straight lines provided by the succession of end beams 11 which will then make up the outer periphery of the platform will not constitute an objection, either to the eye or to the motion of the run board about the post 1. Should the entire carousel be asked for by a prospective purchaser at the factory, the manufacturer can furnish the sections 8, or omit them and make up a smaller machine, as the purchaser may wish.

For the purpose of fastening the sections together at their ends I employ single clamping devices 14, each consisting of a plate 16, having projections 17 extending from the plane thereof at its ends, and an opening 18 extending through its center. The projections 17 will engage the edges of the beams 9 of adjacent sections and hold them together as particularly illustrated in Fig. 4, and the openings 18 in the plates 16 enable these clamping devices to be joined to suspension rods indicated at 21 which have hooks at their upper ends to enable them to be passed through eyelets fixed to the framework 4; whereby the platform is carried in proper position by the framework. The lower ends of these rods are preferably threaded to receive fastening devices, such as nuts and washers, to hold the clamping devices 14 thereon; and the sections 7 and 8 have their beams 9 at their ends which are held in contact by the devices 14 recessed as shown at 19 and 20 respectively in order to give passage to the lower ends of the suspension rods 21 and enable the sections to be fitted tightly together. I also utilize double clamping devices 15 to unite the adjacent corners of the sections. These double clamping devices are like the single clamping devices just described; except that the plate 16 has two projections 17 at each end instead of one. The ends of the section 7 are flush with the ends of section 8; and the double clamping devices are located where the four corners of adjacent sections come together. The projections 17 engage not only the sides of the beams 9 at such points but also the sides of the beams 11; and these projections on both the single and double clamping devices will be so designed as to engage the beams 9 and 11 tightly enough to hold the sections not only against displacement horizontally but against vertical displacement also.

In the embodiment of my invention illustrated in the drawings the inner sections 7 are shown as being large enough for two seat-supporting devices and the sections 8 as large enough to carry only one seat supporting device; but it is obvious that I may make the outer sections 8 big enough for two seat supporting devices the same as the inner sections 7. In fact I desire to be able to utilize the principle of the improvement herein described upon carousels built to carry four horses or other seat-supporting devices abreast as well as three; and when I employ my invention on carousels of the four-horse-abreast type I may obviously dispense with either the inner set or the outer set when the capacity of the machine is to be diminished; in other words I may leave off the outer set of sections or the inner set of sections at will.

Ordinarily three suspension rods for each pair of sections will be sufficient, the innermost supporting the section 7 and the outermost section 8 while the intermediate rod carries part of the weight of both sections. The suspension rods are shown in full in Fig. 1 and illustrated as if broken off a short distance above the floor boards 10 in Figs. 2 and 4 for the sake of saving space on the drawings. The framework 4 is braced by rods 22 secured to a revolving cap 23 at the top of the post 1, and surrounding this post and fixed to it is a gear 24, meshing with gears on rods 25. The rods 25, as is well known, are mounted in bearings 26 on the framework 4, and have cranks by which are actuated certain connections, not shown, for oscillating or rocking the horses, etc. When the framework revolves, the rods or shafts 25 revolve with it, and at the same time rotate in their bearings 26, to give the desired result. When the outer sections 8 of the run board are to be omitted, the outer suspension rods 21 are of course omitted also.

From the above, it will be plain that my improved sectional run board is admirably adapted for the purpose which it is intended to serve: and is very simple and cheap to make. I do not wish, of course, to be restricted to the exact details herein described and shown, but desire to reserve the right to make such alterations as may be necessary, within the scope and spirit of my invention.

It will be noted that the construction above described provides a radially extensible and contractible platform, which may readily be changed in its entirety, as to width, and when so changed, as by the removal of the inner or outer sets of sections, the supporting beams for the flooring of the remaining sections, will not extend laterally beyond the flooring. This is a great advantage in a device of this character, in which the platform revolves when the apparatus is operated, as there are no projecting beams, when either the inner or the outer sections are removed, which might strike a person standing adjacent to the platform.

It will also be noted that each of the sections is self-contained and is separate and distinct from the other sections, and each section is provided with flooring and supporting beams which are independent from the beams and flooring of the other sections. Furthermore, the means for revolubly supporting the two sets of sections has provision in the clamping devices 15 and 16 for the insertion or removal of one set of sections independently of the sections of the other set. This construction enables a change of width of the platform in its entirety, without substantially altering its general form, and without having laterally protruding beams, as would be the case in structures in which removable flooring arranged in detachable sections is mounted upon radial supporting beams common to such flooring sections.

By having the platform divided circumferentially, as well as radially, into inner and outer sets of independent sections removably mounted upon the revoluble frame, the platform, in the knock-down, or detached condition, is conveniently and easily handled and is better adapted for storage and for shipment, due to the relatively small size of each section, than is the case with wide platforms which are radially divisible only, and in which the sections are each the full width of the platform.

Having described my invention, what I believe to be new and desire to secure and protect by Letters Patent of the United States is:—

1. A ring-shaped platform constituted of two sets of sections, one set being arranged end to end along the inner edge of the platform, and the other set end to end along the outer edge thereof, devices for rigidly connecting the ends of the sections of one set together, and the corners of the sections of the one set to the corners of adjacent sections of the other set, and means for suspending the platform, either set of sections being removable to decrease the size of the platform.

2. A ring-shaped platform constituted of two sets of sections, one set being arranged end to end along the inner edge of the platform, and the other set end to end along the outer edge thereof, devices for rigidly connecting the ends of the sections of the one set together, the ends of the sections of the other set together, and the corners of adjacent sections of the one set to the corners of adjacent sections of the other set, and means connected to said devices for suspending the platform, either set of sections being removable to decrease the size of the platform.

3. A ring-shaped platform constituted of two sets of sections, each of said sections comprising radiating beams, floor boards, thereon, and beams connecting the ends of said radiating beams together, one set of sections being arranged end to end along the inner side of the platform and the other set end to end along the outer edge thereof, the other sections being located side by side with the first named sections, clamping devices for joining the ends of the first named sections, additional clamping devices for joining the ends of the other sections, clamping devices for connecting the corners of two adjacent first named sections to the corners of two adjacent sections of the other set and detachable rods for supporting each of said sections, either set of sections being removable to decrease the size of the platform.

4. A ring-shaped platform consisting of two sets of sections, one set of sections being arranged end to end along the inner side and the other set of sections along the outer side of the platform, the other set of sections being located side by side with the first named sections; clamping devices for joining the ends of the first named sections, additional clamping devices for joining the ends of the other sections; clamping devices for connecting the corners of two adjacent first named sections to the corners of two adjacent sections of the other set and detachable rods for supporting said sections, either set of sections being removable to decrease the size of the platform.

5. In a carousel, having a revoluble ring-shaped platform, a ring-shaped platform comprising an inner set of sections and an outer set of sections, each section being self-contained and independent of the other sections, and means for revolubly supporting said sections and which has provision for the insertion or removal of the sections of one set independently of the sections of the other set, and by which the width of the platform in its entirety may be changed.

6. In a carousel, having a revoluble ring-shaped platform, a ring-shaped platform radially extensible and contractible in its entirety, as to width, and means for revolubly supporting the platform.

7. In a carousel, a ring-shaped revoluble platfrom comprising an inner set of sections and an outer set of sections, each section comprising beams and flooring supported thereby, the flooring and beams of each section being separate and distinct from the other sections.

8. In a carousel, having a revoluble ring-shaped platform, a ring-shaped platform comprising an inner set of sections and an outer set of sections, each section comprising beams and flooring supported thereby, the flooring and beams of each section being separate and distinct from the other sections, and means for revolubly supporting the platform and which has provision for the insertion and removal of one set of sections independently of the other set of sections.

9. In a carousel, having a revoluble ring-shaped platform, a ring-shaped platform radially and circumferentially divided into an inner set of sections and an outer set of sections, each section being independent and separate and distinct from the other sections, and means for revolubly supporting the platform and which has provision for the insertion and removal of the sections independently of each other.

In testimony whereof I have hereunto signed my name to this specification.

HARVEY L. MILLER.